Aug. 23, 1932.  A. HULLEY ET AL  1,872,738
TAIL GATE CONTROL DEVICE
Filed April 20, 1931  3 Sheets-Sheet 1

Inventors
Albert Hulley
William J. Hulley
By Liverance and Van Antwerp
Attorneys Aug. 23, 1932.   A. HULLEY ET AL   1,872,738
TAIL GATE CONTROL DEVICE
Filed April 20, 1931   3 Sheets-Sheet 2

Inventors
Albert Hulley
William J. Hulley
By Livrance and
Van Antwerp
Attorneys

Aug. 23, 1932.  A. HULLEY ET AL  1,872,738

TAIL GATE CONTROL DEVICE

Filed April 20, 1931   3 Sheets-Sheet 3

Inventors
Albert Hulley
William J. Hulley
By Liverance and Van Antwerp
Attorneys Patented Aug. 23, 1932

1,872,738

UNITED STATES PATENT OFFICE

ALBERT HULLEY AND WILLIAM J. HULLEY, OF CITY ISLAND, NEW YORK

TAIL GATE CONTROL DEVICE

Application filed April 20, 1931. Serial No. 531,350.

This invention broadly relates to a dumping apparatus and more particularly to a mechanism adapted to be attached to a dump truck whereby the dumping of the truck operates the mechanism, this mechanism being for the purpose of unlatching the tail gate of the truck and then elevating the tail gate of the truck to its open position.

Hitherto considerable difficulty has been encountered in structures of this character in that the several parts of the mechanism do not function together under all conditions and are more or less complicated and it is an object of our invention to inventably create a combined latching and opening device or mechanism which will not only be relatively simple in structure but which will function perfectly under all conditions.

In the first place we provide common means for operating the linkage which opens the tail gate and the linkage which actuates the tail gate latching mechanism. Thus a single actuator serves a dual purpose. Hand in hand with the feature just recited it will be noted that the linkage which operates the tail gate from its closed to its open position does not become operative immediately but has a considerable lost motion at the beginning of its movement. This is for the purpose of allowing the tail gate latching mechanism to operate so as to release the tail gate before the opening of the tail gate starts.

Still another advantage of our invention resides in the fact that the common operative means for the opening and the latching of the tail gate is detachably connected to the chassis of the truck whereby it may be rendered operative or inoperative during the tilting or dumping of the truck body. Thus it is possible to keep the tail gate closed and in a locked position during the tilting of the body for any purpose. For instance, when a truck is equipped with a double decked body, such as set forth in our application on inclosable dump body, Serial No. 429,262, filed February 18, 1930, it is often desirable to dump the load off of the top deck without dumping the contents of the lower deck. In such case the tail gate is unaffected during tilting operation of the truck body and remains closed. Also, at times it may be desirable to shift the load to the rear of the truck body without dumping it through the tail gate and when such is desired the common actuating means is rendered ineffective during the tilting operation of the truck and hence the tail gate remains closed.

Another feature of our invention relates to the toggle mechanism whereby both the tail gate and the latching hook therefor are automatically held in their closed position. That is to say, the leverage system or linkage arrangement is so made up as to form toggles which travel past their centers or alined positions whereby they tend to remain locked.

Further objects, and objects pertaining to the details and economy of construction and operation of our invention, will definitely appear from the detailed description to follow.

In the drawings:—

Figure 5:
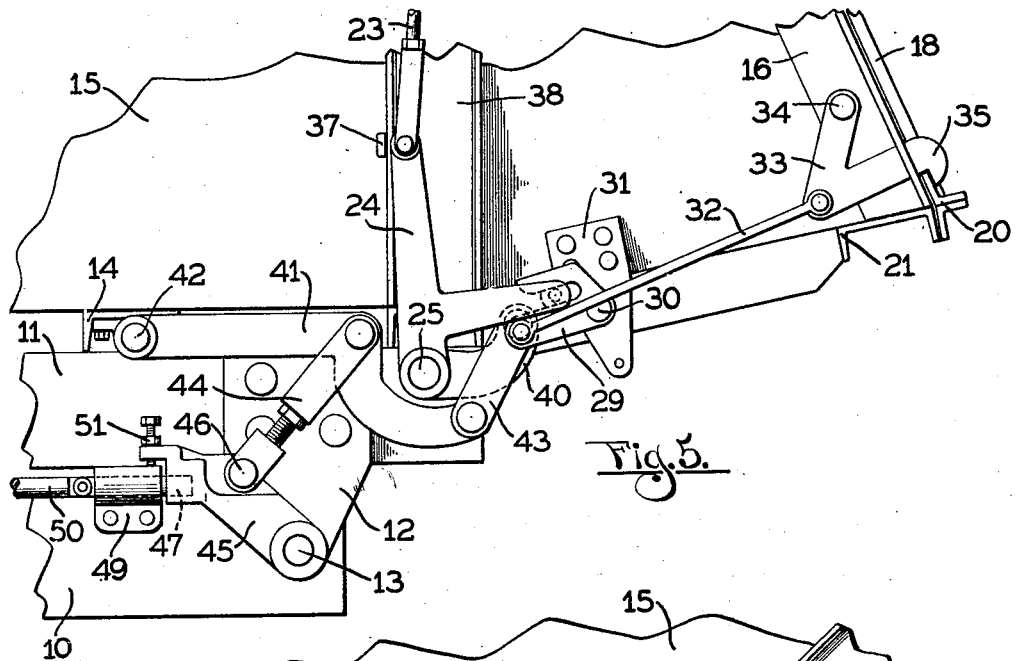
Fig. 5 is an enlarged view of the bottom portion of Fig. 2 but disclosing the locking plunger in operative position whereby the locking arm is held stationary as the truck body is tilted rearwardly.
Figure 6:
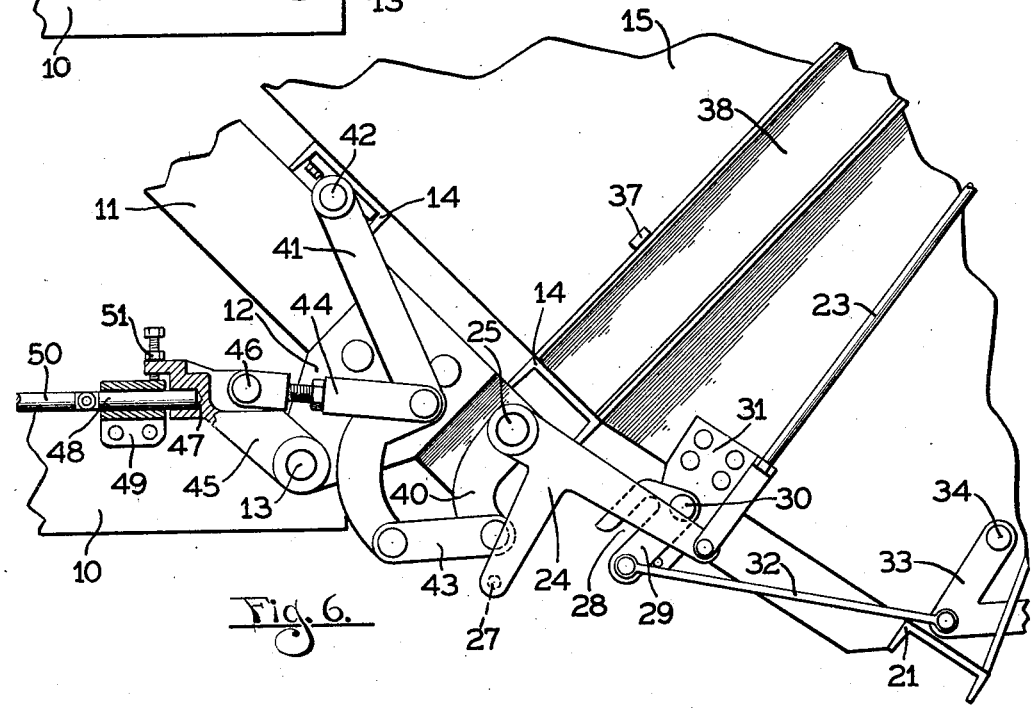

Fig. 6 discloses the position of the several links as shown in Fig. 5, after the body has been tilted rearwardly as shown.

Similar numerals refer to similar parts throughout the several views.

The chassis 10, as of a motor vehicle, has a frame 11 thereabove, this frame carrying depending brackets 12 which are pivotally supported on the chassis 10 as at 13. The frame 11 supports cross channels 14 which in turn carry the body 15 of the truck. Reinforcing members 16 are fastened near either side at the rear end thereof and their upper ends curved outwardly so as to form bearings to receive the tail gate shaft 17 therein, as clearly shown in Fig. 1. The members 16 are in the form of angles and are slotted at their lower ends, see Fig. 2, to receive the tail gate latching means as will later be set forth.

Figure 1:
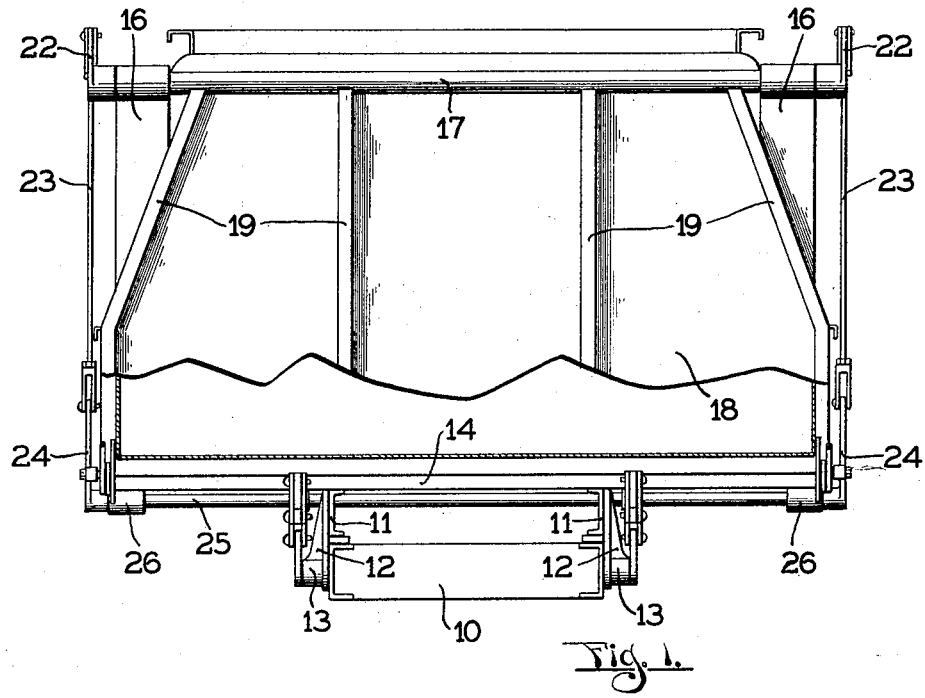
Fig. 1 is a rear elevation of a truck chassis equipped with our invention, part of the tail gate being broken away in order to clarify the showing.
Figure 3:
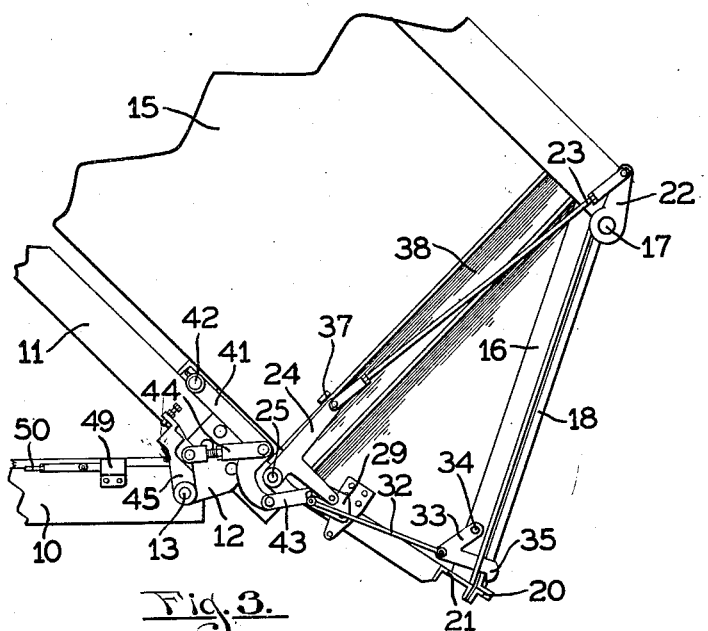
Fig. 3 is a view similar to Fig. 2, but showing the body tilted upwardly to a position whereby the contents of the truck will gravitate toward the rear end thereof.
Figure 4:
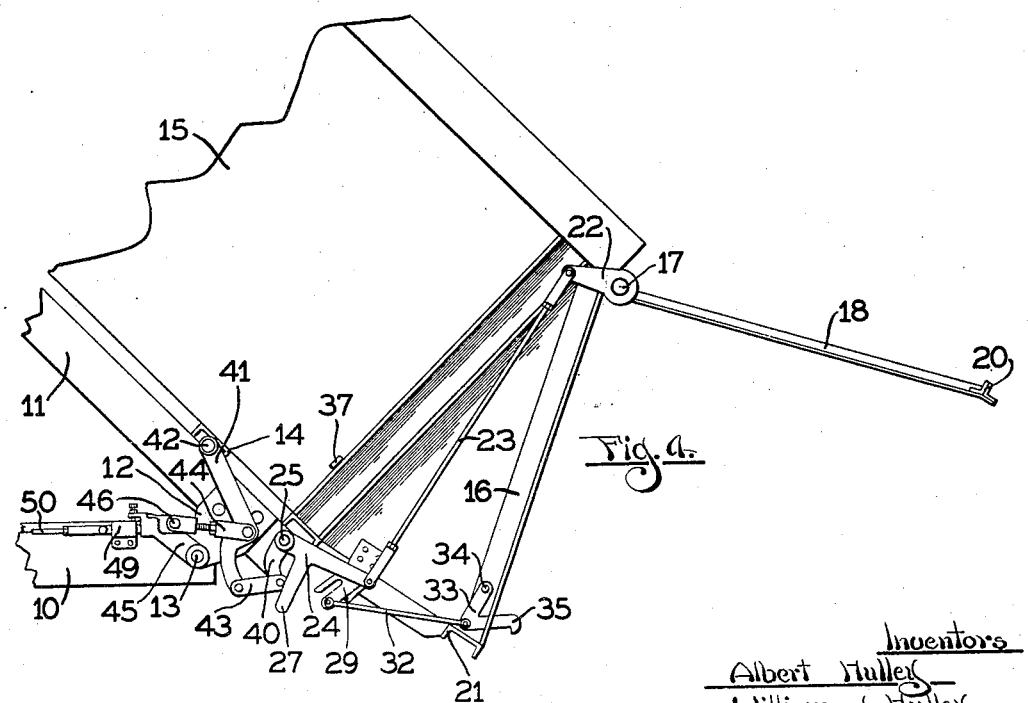
Fig. 4 is a view likewise similar to Fig. 2 but showing the truck body tilted upwardly and the tail gate opening and locking mechanism in operative position.

The tail gate 18 has vertical reinforcing members 19, see Fig. 1, and is rigidly fastened to and depends from the tail gate shaft 17 so that rotative movement of the shaft causes the tail gate to move therewith. Angle members 20 extend crosswise of the tail gate 18 at the lower edge thereof and these angles 20 abut against the flange of the cross channel member 21 when the tail gate is in its closed position. See Fig. 3. If desired, a resilient piece of material, such as rubber, may be inserted between the tail gate 18 and the base of the channel member 21 in order that a tight closure may be obtained therebetween. Also, this resilient bumper member should extend upwardly along the outer or rear face of the reinforcing angle member 16 so as to come between this member and the tail gate.

Crank arms 22 are keyed to either end of the tail gate shaft 17 and adjustable length operating rods 23 are pivoted to the ends thereof and extend downwardly to pivotally connect with the T-links 24.

The T-links are rigidly attached to the cross shaft 25, this cross shaft being pivotally mounted in the depending bearing members 26 and passing through the frame 11 as clearly shown in Fig. 1. The stem of the T-link has a projection 27 extending therefrom, this projection being adapted to enter the recess 28 in the U-member 29 whenever the tail gate is in its closed position. See Figs. 2, 3 and 5.

The U-member is pivoted upon the bracket 31 as indicated at 30 and a latch tie rod 32 connects one arm of the U-member 29 with the tail gate latch 33. The tail gate latching member is pivoted at 34 upon the reinforcing member 16 and has a hook 35 which extends through the slot in the member 16, as previously mentioned, this hook 35 engaging against one of the cross angle members 20 as clearly shown in Figs. 2, 3 and 5.

Whenever the shaft 25 is rotated clockwise, see Fig. 5, and likewise the T-link member 24 is moved the projection 27 cams against one side of the slot in which it is riding and turns the U-member downwardly to the position shown in Fig. 6. This movement turns the U-member about its pivot 30 and causes the latch tie rod 32 to cross its dead center position and then to raise the latch member 33 about its pivot 34, thus unlocking the hook 35 from the cross angle 20 on the tail gate 18. Thus the tail gate is released for upward movement. As clearly shown in Fig. 5 the ends of the tie rod 32 and the pivot point 30 are so arranged as to form a locking toggle. That is, any tension upon the tie rod 32 caused by the tail gate latch 33, tends to rotate the U-member clockwise and hence pushes the T-link 24 against the stop 37. Thus, unlatching of the tail gate latch is absolutely prevented.

The several links are so constructed that the initial movement of the T-links 24 about its pivot will cause the latch 33 to unfasten and no movement whatsoever of the tail gate 18 will occur. It is true that the T-link 24 will move in a clockwise direction but the rod 23 between the T-link and the crank arm 22 so connects with the T-link as to form a toggle therebetween. The initial movement of this pivotal connection between the rod 23 and the T-link does not cause any movement of the crank arm 22 as will be apparent from an inspection of the drawings. Furthermore, this pivotal connection is so located, when the tail gate is closed, as to abut against the stop 37, this stop being attached to a vertical reinforcing channel member 38 on the side of the body 15, and any force exerted against the tail gate to open the same merely locks it all the more firmly in position. Thus we obtain a double lock for the tail gate.

The cross shaft 25 extends underneath the truck body, see Fig. 1, and crank arms 40 depend therefrom. See Figs. 5 and 6. A lever member 41 is pivoted as at 42 below the cross channel member 14 and a link 43 connects the end of this lever to the crank 40. The drawings disclose two sets of the lever members 41 and their appurtenances but obviously one set would operate in identically the same way.

A locking arm link 44 pivots to the lever 41 and furnishes the power to operate the same. The lever 41 is, in effect, a lever of the third class.

The locking arm link 44 straddles the locking arm 45 and is pivotally connected thereto as at 46, the locking arm 45 being pivoted onto the pivot 13 which forms a pivotal connection for the body of the truck. The locking arm 45 has a recess 47 therein, this recess receiving the locking plunger 48 therein. See Fig. 6. The locking plunger 48 is guided in a bearing member 49 and a rod 50 extends forwardly along the side of the chassis of the truck to an operating lever in the cab (not shown) whereby the plunger 48 may be either inserted into or withdrawn from the recess 47 in the locking arm 45. An adjusting means 51, as clearly shown in Figs. 5 and 6, provides means whereby the locking arm may be kept properly positioned with relation to the sliding plunger 48.

Figure 2:
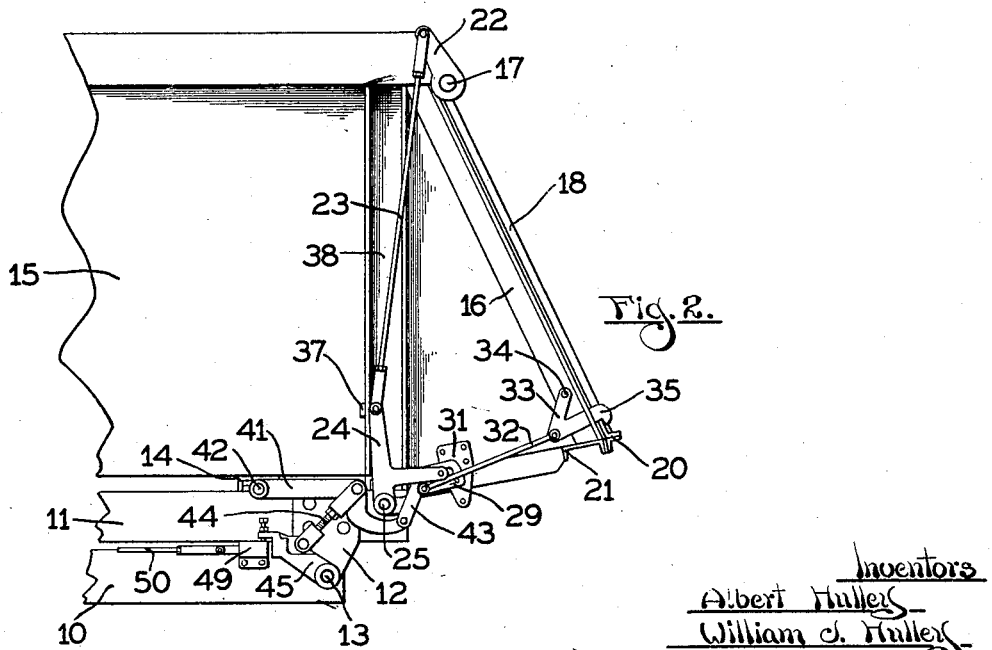
Fig. 2 is a side view of Fig. 1, the tail gate being in a closed position and the tail gate latch being engaged therewith to hold the tail gate in such a closed position.

When the several parts are in the position as disclosed in Fig. 2 and the body is tilted no opening of the tail gate will occur because the locking arm will simply move upwardly with the tilting of the body and no tension will be transmitted through the locking arm link 44 because the pivot of the locking arm 45 and the body member is identical. Hence the several parts will remain in their relative positions, as clearly shown in Fig. 3. However, should the locking plunger 48 be positioned rearwardly as shown in Fig. 5, the upward movement of the truck body 15 will cause the lever 41 to be rotated downwardly and hence the shaft 25 will be turned and the T-link 24 operated. As previously described this operation of the T-link will cause the tail gate to open shortly after the latch 33 has been released.

Having thus described our invention we desire it to be understood that the invention is in nowise limited to the particular illustrative embodiment disclosed, the scope thereof being set forth in the following claims.

We claim:

1. In a pivoted dump truck having a pivoted tail gate the combination of an arm rigid with the axis of the tail gate, a T-link pivoted on the body of the dump truck, an adjustable length rod connecting the arm and one arm of the T-link, a lever member pivoted onto the body of the truck, interconnecting means between the lever member and the T-link whereby movement of the lever member will cause operation of the tail gate to an open position, a crank arm pivoted upon the axis of the dump body of the truck, a link connecting the last mentioned crank arm and the lever member and slidable means on the truck chassis adapted to engage the crank arm to prevent its movement during the tilting or dumping operation of the truck body.

2. In combination, a pivoted gate, means extending from the gate to operate the same, latching means for the gate, a member pivoted to swing about a fixed pivot, a latch tie rod pivoted at one end to the latching means and at its other end to the said member, said tie rod having one of its pivots so arranged as to cross a line connecting the other pivot and the pivot about which the said member pivots whereby a toggle action is had during the operation of the latching means for the gate, and common means for actuating both the first mentioned means and the said member.

3. A combination of elements as set forth in claim 2 in which the said member has a camming slot therein, said slot receiving a pin on the common means whereby the latching means is operated.

4. In a pivoted dump truck having a pivoted tail gate the combination of an arm rigid with the axis of the tail gate, a crank arm pivoted to the axis about which the dump truck pivots, means connecting the crank arm and the first mentioned arm whereby dumping of the truck causes the tail gate to open, means for maintaining the crank arm from movement during the dumping movement, and means for rendering the last mentioned means inoperative.

5. In a truck having a pivoted dump body with an upwardly swinging tail gate, the combination of, an arm rigid with and extending from the axis of the tail gate, an operating rod pivotally connected to said arm, a link pivotally mounted upon a fixed pivot, said operating rod being pivotally connected to the link, said rod and said link, when the tail gate is closed, being slightly to one side of a line connecting the axis about which the link swings and the pivoted connection between the rigid arm and the operating arm, and means to act upon the link to swing it across the said imaginary line during the operation of the tail gate.

6. A combination of elements as recited in claim 5 and also having stop means to prevent excessive movement of the rod and link in one direction.

7. A combination of elements as set forth in claim 5 combined with stop means to prevent excessive movement of the rod and the link in one direction and latching means for the tail gate, said latching means being operated during the movement of the rod and link from the said stop means to a substantially aligned position.

8. A tail gate mechanism consisting of a movable latching member having a hooked portion engaging the tail gate to prevent the same from opening, a pivoted member spaced from the tail gate, a link connecting the said pivoted member and the latching member, means to swing the pivoted member to a position whereby the link crosses the pivot of said member thus giving a toggle action of the involved parts, said pivoted member having a camming slot therein and a pin mounted on the said means riding in the said slot whereby the pivoted member is swung.

9. In combination, a pivoted gate, means extending from said gate whereby the gate may be swung open or closed as desired, latching means adapted to hold said gate in its closed position, means for operating both sets of means and means for disconnecting the latching means as described.

10. A tail gate control device adapted to be mounted upon a dump truck comprising, means for opening the tail gate, locking means for holding the tail gate in its closed position, common means for operating both of the aforesaid means, means operatively related to the common means and the dump truck whereby movement of the body of the dump truck causes actuation of the common means and means for rendering said common means inoperative.

11. A tail gate control device comprising means for opening the tail gate, latching means for holding the tail gate in its closed position, common means for operating both of the aforesaid means and means for disconnecting the common means from said latching means during the time that the tail gate is in wide open position.

In testimony whereof we affix our signatures.

ALBERT HULLEY.
WILLIAM J. HULLEY.